United States Patent [19]

Dehart et al.

[11] 4,372,170

[45] Feb. 8, 1983

[54] FLOW MEASURING APPARATUS

[75] Inventors: Marv L. Dehart, Mesquite; M. Leon Kloostra, Rowlett; Harold E. Straub, Garland, all of Tex.

[73] Assignee: Environmental Elements Corp., Baltimore, Md.

[21] Appl. No.: 849,403

[22] Filed: Nov. 7, 1977

[51] Int. Cl.³ .......................... G01F 1/42; G01F 1/46
[52] U.S. Cl. .............................. 73/861.61; 73/861.65
[58] Field of Search .................... 73/205 R, 211, 212, 73/202

[56] References Cited

U.S. PATENT DOCUMENTS

| | | | |
|---|---|---|---|
| 790,888 | 5/1905 | Ferris | 73/202 |
| 1,145,235 | 7/1915 | Dodge | 73/212 |
| 2,441,042 | 5/1948 | Stoll | 73/212 X |
| 2,614,423 | 10/1952 | Carbone | 73/211 |
| 2,942,465 | 6/1960 | Carbone | 73/211 |
| 3,374,673 | 3/1978 | Trageser | 73/202 |
| 3,590,473 | 7/1971 | Carlson | 73/212 X |
| 3,667,494 | 6/1972 | Haase | 73/213 |
| 3,889,536 | 6/1975 | Sylvester | 73/212 |
| 3,937,082 | 2/1976 | Schilling | 73/212 |

FOREIGN PATENT DOCUMENTS 590790  5/1933  Fed. Rep. of Germany ........ 73/221

*Primary Examiner*—Herbert Goldstein
*Attorney, Agent, or Firm*—Herbert J. Zeh, Jr.; Oscar B. Brumback

[57] ABSTRACT

A flow measuring apparatus having increased sensitivity is disclosed for measuring the flow of gas, particularly through a confined passage. The flow measuring apparatus comprises a tube having a constant or tapered orifice section followed by an abrupt expansion of the orifice; a total pressure sensing probe is located preferably in the section of the tube with the constant or tapered orifice, the total sensing probe having an opening parallel to the flow of gas and facing upstream; and a static pressure sensing probe is located in the walls of the tube in the expanded orifice section immediately after the abrupt expansion, the static pressure probe having an opening either parallel to the flow of gas and facing downstream or perpendicular to the flow of gas. The sensing probes may be connected to a measuring device that provides a readout of the sensed pressures or pressure differential or to a control unit that is responsive to the sensed pressures or pressure differential.

2 Claims, 5 Drawing Figures

U.S. Patent          Feb. 8, 1983          4,372,170
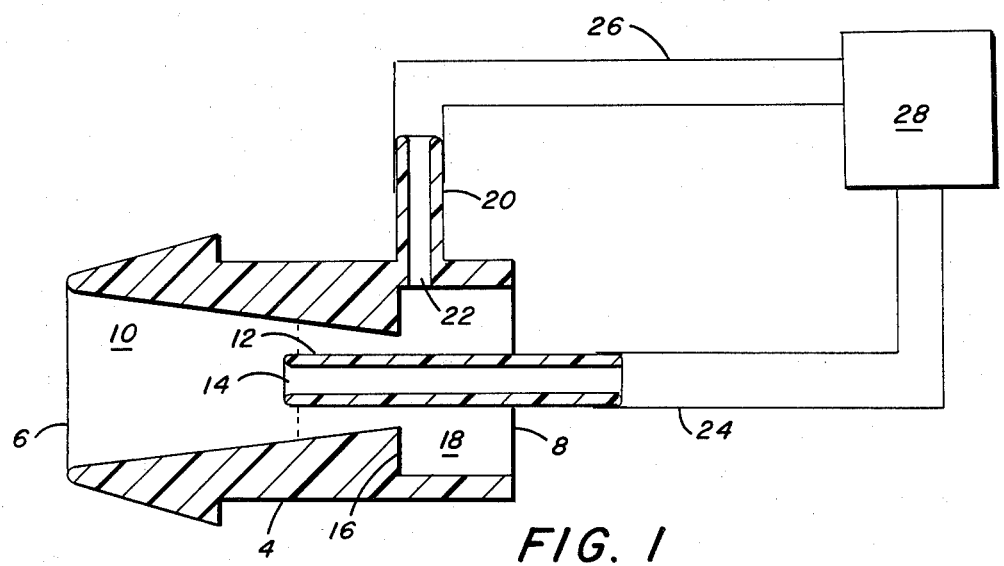
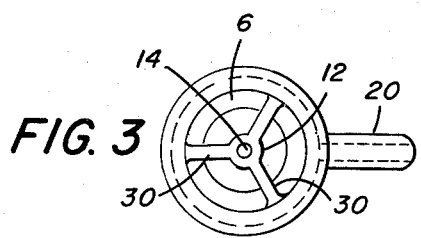
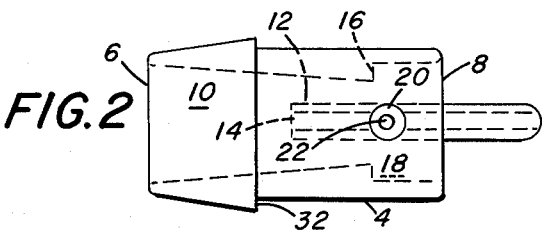
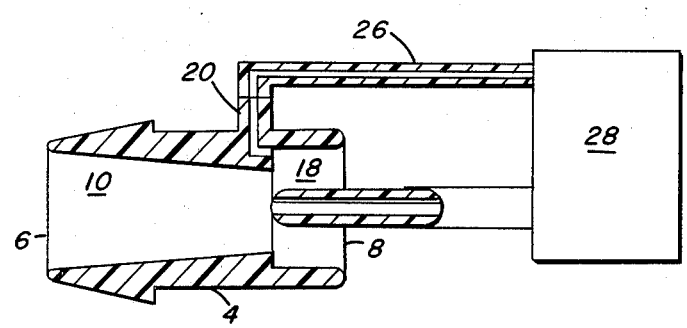
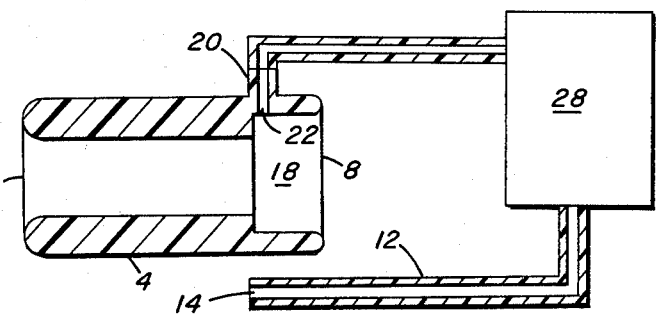

FLOW MEASURING APPARATUS

BACKGROUND OF THE INVENTION

The present invention is directed to an apparatus for measuring the total pressure and static pressure of a gas flowing in a passage. The flow or velocity pressure may readily be obtained from these measured conditions of pressure and a control function can be accomplished by using either the total pressure and static pressure values or the velocity pressure value.

Various devices have been proposed in the past for measuring the flow of gas, particularly in a confined passage, such as ducts in heating, ventilating and air conditioning systems. Many of the devices have been based on Pitot tubes or modified Pitot tubes. These devices have not been entirely satisfactory because of their low sensitivity, particularly at low flow velocities. Many of the devices have also been based on venturi type arrangements; however, the venturi arrangements have not been entirely satisfactory, particularly at low velocities.

It is therefore an object of the present invention to provide a flow sensing apparatus that has increased sensitivity even at low flow velocities.

SUMMARY OF THE INVENTION

The present invention provides a flow measuring apparatus for gases having increased sensitivity even at low flow velocities. For achieving the increased sensitivity the apparatus has a tube with a constant or tapered orifice section followed by an abrupt expansion of the orifice which then preferably remains constant across the rest of the length of the tube. A total pressure sensing probe or tap is provided in the portion of the tube with the smaller orifice and a static pressure probe or tap is provided in the tube in the expanded orifice section near the point where the abrupt expansion of the orifice occurs. The flow pressure or velocity of the flowing gas is determined by comparing the sensed total pressure and the sensed static pressure. The total pressure being equal to the sum of the static pressure and the velocity pressure.

The apparatus of the present invention may have both probes connected to a gauge thus providing a visual readout based on the difference between the sensed total pressure and the sensed static pressure. This difference being an indirect measurement of velocity pressure. Alternatively, the probes may be connected to a pressure responsive control device that is used to control the parameters of some operation such as the flow of air through a duct. It is believed that the present sensing apparatus will have its widest application in controlling the flow of air in heating, ventilating and air conditioning systems.

The abruptly expanding orifice with the static pressure probe located in the tube after the point of abrupt expansion amplifies the sensed pressure differential by reducing the sensed static pressure. The abrupt expansion of the orifice causes a false static pressure reading in the area immediately after the abrupt expansion that is lower than the true static pressure of the system. The area immediately following the abrupt expansion has an artificially reduced static pressure. By locating the static pressure probe in the expansion chamber where the sensed static pressure is artificially depressed, a larger pressure differential between total pressure and static pressure is obtained. This amplification of the pressure differential and hence velocity pressure also occurs at even low flow velocities thus providing a more sensitive measuring apparatus. As can be realized, the amount of depression of the static pressure is related to the ratio of the orifice area immediately after expansion to the orifice area immediately before expansion. If the areas of the orifice after and before expansion are close, the amount of depression of the static pressure will be small. As this ratio increases, the amount of depression of static pressure will increase; however, as would be realized, diminishing returns will occur.

The total pressure sensing probe is located in the center of the tube in the constant or tapered orifice section and is parallel to the flow of gas with its opening facing upstream. By locating the total sensing probe near the center of the tube a more representative reading of total pressure is obtained. The tube acts as a flow collector and straightener, thereby providing a more representative reading of total pressure. The total sensing probe may be located anywhere in the constant or tapered orifice section and may be located slightly into the expanded chamber section. Care should be taken in not locating the total pressure tap too near the upstream opening of the tube or too far into the expansion chamber or else the advantages of the tube acting as a flow collector-straightener will not be realized. As mentioned above, the orifice in the upstream end of the tube may be constant or tapered. It is preferred that it be tapered so a greater abrupt expansion of the orifice can be obtained. It should also be pointed out that the total pressure probe can be located external of the tube; however, it is preferred that it be located in the center of the tube.

Other objects and advantages of the present invention along with the preferred embodiment and obvious modifications thereof will be described in more detail hereinafter, particularly with reference to the attached drawings.

FIG. 1 is a somewhat schematic illustration of the preferred apparatus of the present invention;

FIG. 2 is a side view of the sensor of the present invention;

FIG. 3 is an end view through AA of FIG. 2;

FIG. 4 is a somewhat schematic illustration of an alternate embodiment of an apparatus of the present invention;

FIG. 5 is a somewhat schematic illustration of another alternate embodiment of the present invention.

With respect to FIGS. 1, 2 and 3, a tube 4 is provided in an air flow passage 2, not shown, through which a portion of the air flowing in the passage must pass tube 4. The tube has an upstream end 6 and a downstream end 8 with the opening of the tube parallel to the direction of flow. The orifice in the upstream end is tapered inwardly to form a tapered orifice section 10 or an area of constricted flow 10. A total pressure probe or tap 12 is positioned in the center of tapered orifice section 10 and has its inlet opening 14 parallel to the flow of gas and facing upstream. The tapered orifice section 10 abruptly expands at 16 to form an expansion chamber 18 or a section of tube 4 with a larger orifice. The orifice is then preferably constant across the remainder of the tube although it may be tapered inwardly or outwardly. A static pressure sensing probe or tap 20 is located in the walls of the tube immediately after the abrupt expansion. The inlet opening 22 of the static pressure probe is perpendicular to the flow of gas. Sensing probes 12 and 20 are connected by tubes 24 and 26, respectively, to control means 28. Control means 28 is responsive to the pressure differential sensed by probes 12 and 20 and is used to measure and control the flow of velocity through air flow passage 2. Alternately, control means 28 may be replaced by a visual readout means. It should be noted that some control means may require that air be bled into the sensor through static probe 20. The flow measuring apparatus of the present invention is operable under these conditions.

With respect to FIGS. 2 and 3, the preferred sensor of the present invention described above is further illustrated in more detail. Tube 4 has an upstream end 6 and a downstream end 8. The orifice in the upstream end is tapered inward and expands abruptly at 16 to form an expansion chamber 18. A total sensing probe 12 having an opening 14 parallel to the flow of gas and facing upstream is located in the constricted orifice or throat area 10. The probe is suitably held in place by webs 30 which are preferably made as one integral unit with the rest of the sensor. A static pressure probe 20 is provided with its opening 22 located in the walls of the expansion chamber. The opening of the static pressure probe is perpendicular to the flow of gas and is located in the walls of tube 4 immediately after the abrupt expansion of the orifice. Tube 4 also has a nipple 32 which is optional and which is useful for holding the sensing device in an air duct.

With respect to FIG. 4, there is shown an alternate embodiment of the present invention. Tube 4 has an upstream end 6 and a downstream end 8. The orifice at the upstream end is tapered and abruptly expands at 16 to form an expansion chamber 18. A total pressure sensing probe 12 is located at the end of the tapered orifice section 10 and has its opening 14 parallel to the flow of gas and facing upstream. A static pressure sensing probe 20 is located in the wall of the tube in expansion chamber section 18. The opening 22 of static pressure probe 20 is parallel to the flow of gas and facing downstream.

With respect to FIG. 5, there is shown another alternate embodiment of the present invention. Tube 4 has an upstream end 6 and a downstream end 8. The orifice at the upstream end is constant in diameter and abruptly expands at 16 to form an expansion chamber 18. A total sensing probe 12 is located external of tube 4 and has its opening 14 parallel to the flow of gas and facing upstream. A static pressure sensing probe 20 is located in the walls of the expansion chamber section 18 and has its opening 22 perpendicular to the flow of gas.

As would be realized, there are other embodiments of the present invention. The important feature of all the embodiments being the static pressure probe being located in the area of artificially reduced static pressure, that is, immediately after the abrupt expansion of the orifice.

What is claimed:

1. A gas flow sensing device comprising a tube having an upstream end and a downstream end, the orifice in the upstream end being tapered to form a tapered orifice section, an abrupt expansion of the orifice to form an expansion chamber in the downstream end, a total pressure probe located in the tapered orifice section and having its opening parallel to the flow of gas and facing upstream, a static pressure probe located in the expansion chamber at the abrupt expansion of the orifice and having its opening perpendicular to the flow of gas, means for connecting the total pressure probe and static pressure probe to a visual readout means or a control means.

2. A gas flow sensing device comprising a tube having an upstream end and a downstream end, the orifice in the upstream end being tapered to form a tapered orifice section, an abrupt expansion of the orifice to form an expansion chamber in the downstream end, a total pressure probe located in the tapered orifice section and having its opening parallel to the flow of gas and facing upstream, a static pressure probe located in the expansion chamber at the abrupt expansion of the orifice and having its opening parallel to the flow of gas and facing downstream, means for connecting the total pressure probe and static pressure probe to a visual readout means or a control means.

* * * * *